(12) United States Patent
Kang

(10) Patent No.: US 12,525,319 B2
(45) Date of Patent: Jan. 13, 2026

(54) METHOD FOR PROVIDING SERVICE ON BASIS OF GENETIC INFORMATION ON USER GROUP, AND ELECTRONIC DEVICE THEREFOR

(71) Applicant: Samsung Electronics Co., Ltd., Gyeonggi-do (KR)

(72) Inventor: Hyeyoon Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 17/423,550

(22) PCT Filed: Jan. 16, 2020

(86) PCT No.: PCT/KR2020/000800
§ 371 (c)(1),
(2) Date: Jul. 16, 2021

(87) PCT Pub. No.: WO2020/149664
PCT Pub. Date: Jul. 23, 2020

(65) Prior Publication Data
US 2022/0076786 A1    Mar. 10, 2022

(30) Foreign Application Priority Data

Jan. 18, 2019    (KR) .................... 10-2019-0006936

(51) Int. Cl.
*G16B 25/10*    (2019.01)
*G06N 3/12*     (2023.01)
*G16H 10/60*    (2018.01)

(52) U.S. Cl.
CPC ............... *G16B 25/10* (2019.02); *G06N 3/12* (2013.01); *G16H 10/60* (2018.01)

(58) Field of Classification Search
CPC ........... G16H 50/30; G16H 10/60; G06N 3/12
See application file for complete search history.

(56) References Cited

U.S. PATENT DOCUMENTS

| | | |
|---|---|---|
| 10,867,705 B2 | 12/2020 | Ball et al. |
| 2002/0082869 A1 | 6/2002 | Anderson |
| 2011/0137944 A1 | 6/2011 | Rolls |
| 2011/0202486 A1 | 8/2011 | Fung et al. |
| 2013/0151270 A1 | 6/2013 | Nova et al. |
| 2013/0310663 A1 | 11/2013 | Kozloski et al. |
| 2015/0193588 A1 | 7/2015 | Nemoto et al. |
| 2016/0198978 A1 | 7/2016 | Nemoto et al. |
| 2016/0321395 A1 | 11/2016 | Colby et al. |
| 2018/0001184 A1 | 1/2018 | Tran et al. |
| 2018/0204632 A1 | 7/2018 | Kang et al. |
| 2019/0172587 A1 | 6/2019 | Park et al. |

FOREIGN PATENT DOCUMENTS

| | | |
|---|---|---|
| JP | 6212784 B2 | 10/2017 |
| KR | 10-2000-0072098 A | 12/2000 |
| KR | 2000-0072527 A | 12/2000 |
| KR | 10-2013-0102239 A | 9/2013 |
| KR | 20130132802 A | 12/2013 |
| KR | 20140103611 A | 8/2014 |
| KR | 20140119022 A | 10/2014 |
| KR | 10-1561234 B1 | 10/2015 |
| KR | 20160118391 A | 10/2016 |
| KR | 101722107 B1 | 4/2017 |
| KR | 20170134203 A | 12/2017 |
| KR | 10-2018-0030008 A | 3/2018 |
| KR | 10-2018-0073779 A | 7/2018 |
| KR | 10-2018-0083684 A | 7/2018 |
| KR | 20180079209 A | 7/2018 |
| KR | 10-2018-0126911 A | 11/2018 |
| WO | 2010/018575 A1 | 2/2010 |

OTHER PUBLICATIONS

European Office Action dated Dec. 20, 2023.
European Search Report dated Jan. 25, 2022.
Chinese Office Action dated Mar. 6, 2025.
Korean Office Action dated Nov. 13, 2024.
Chinese Office Action dated Aug. 29, 2025.
Korean Notice of Patent Grant dated Jul. 28, 2025.
Chinese Rejection Decision dated Nov. 19, 2025.
European summons to oral proceedings dated Oct. 22, 2025.

*Primary Examiner* — Jerry Lin
(74) *Attorney, Agent, or Firm* — Cha &Reiter, LLC.

(57) ABSTRACT

The purpose of the present invention is to provide a service on the basis of genetic information on a user group. A method of operating an electronic device may comprise: an operation for grouping genetic information on a plurality of users belonging to a user group; an operation for determining genetic characteristics of the user group on the basis of the grouped genetic information; and an operation for providing data generated on the basis of the genetic characteristics of the user group.

20 Claims, 10 Drawing Sheets

Family 1 (310)

Disease risk (312)
| | | |
|---|---|---|
| Diabetes | ✗ | 1 |
| Hypertension | ✗ | 1 |
| Obesity | ! | 3 |
| Colorectal Cancer | ! | 3 |
| Stomach cancer | ✓ | 5 |

Wellness traits (314)
| | | |
|---|---|---|
| Satiety | ✗ | 1 |
| Snack intake | ✓ | 5 |
| Lactose intolerance | ✗ | 1 |
| Gluten sensitivity | ✗ | 1 |
| Sweet taste preference | ! | 3 |

Family 3 (320)

Disease risk (322)
| | | |
|---|---|---|
| Diabetes | ✓ | 5 |
| Hypertension | ! | 3 |
| Obesity | ! | 3 |
| Colorectal Cancer | ! | 3 |
| Stomach cancer | ✗ | 1 |

Wellness traits (324)
| | | |
|---|---|---|
| Satiety | ✓ | 5 |
| Snack intake | ✓ | 5 |
| Lactose intolerance | ! | 3 |
| Gluten sensitivity | ✓ | 5 |
| Sweet taste preference | ✓ | 5 |

Family 2 (330)

Disease risk (332)
| | | |
|---|---|---|
| Diabetes | ! | 3 |
| Hypertension | ✗ | 1 |
| Obesity | ✓ | 5 |
| Colorectal Cancer | ✗ | 1 |
| Stomach cancer | ✓ | 5 |

Wellness traits (334)
| | | |
|---|---|---|
| Satiety | ! | 3 |
| Snack intake | ✓ | 5 |
| Lactose intolerance | ✗ | 1 |
| Gluten sensitivity | ! | 3 |
| Sweet taste preference | ! | 3 |

Family Profile (340)

Disease risk (342)
| | | |
|---|---|---|
| Diabetes | ! | 3.0 |
| Hypertension | ✗ | 1.7 |
| Obesity | ! | 3.7 |
| Colorectal Cancer | ! | 2.3 |
| Stomach cancer | ! | 3.7 |

Wellness traits (344)
| | | |
|---|---|---|
| Satiety | ! | 3.0 |
| Snack intake | ✓ | 5.0 |
| Lactose intolerance | ✗ | 1.7 |
| Gluten sensitivity | ! | 3.0 |
| Sweet taste preference | ! | 3.7 |

FIG.3B

METHOD FOR PROVIDING SERVICE ON BASIS OF GENETIC INFORMATION ON USER GROUP, AND ELECTRONIC DEVICE THEREFOR

CROSS REFERENCE TO RELATED APPLICATIONS

This application is a National Phase Entry of PCT International Application No. PCT/KR2020/000800, which was filed on Jan. 16, 2020, and claims a priority to Korean Patent Application No. 10-2019-0006936, which was filed on Jan. 18, 2019 the contents of which are incorporated herein by reference.

TECHNICAL FIELD

Various embodiments of the disclosure relate to a method for providing a service on the basis of genetic information of a user group and an electronic device thereof.

BACKGROUND ART

With the development of technology, various services are provided through electronic devices. In response to various demands, beyond simply based on interactions with users, research on customized services based on additional information about users is also being actively conducted. For example, a service that provides health-related information using genetic information is being considered.

DISCLOSURE OF INVENTION

Technical Problem

A service using genetic information of a user registered in an electronic device may be provided. In general, a service using genetic information may be provided based on the genetic information of a specific individual. Accordingly, even in a device shared by a plurality of users, an optimized service is not provided for all of a plurality of users, and a service reflecting the characteristics of a plurality of users may not be provided.

Various embodiments of the disclosure provide a method for providing a service, based on genetic information of a plurality of users and an electronic device thereof.

Solution to Problem

According to various embodiments of the disclosure, an operating method of an electronic device may include grouping genetic information of a plurality of users belonging to a user group, determining genetic characteristics of the user group, based on the grouped genetic information, and providing data generated based on the genetic characteristics of the user group.

According to embodiments various of the disclosure, an electronic device may include a memory and a processor connected to the memory. The processor may be configured to group genetic information of a plurality of users belonging to a user group, to determine genetic characteristics of the user group, based on the grouped genetic information, and to provide data generated based on the genetic characteristics of the user group.

Advantageous Effects of Invention

The method and the electronic device according to various embodiments may provide various services, based on genetic profiles of a plurality of users through linking of accounts registered in a common device used by various people.

BRIEF DESCRIPTION OF DRAWINGS

FIG. 3B is an example of genetic information of a plurality of users according to various embodiments of the disclosure;

BEST MODE FOR CARRYING OUT THE INVENTION

Hereinafter, various embodiments are described in detail with reference to the accompanying drawings.

Figure 1:
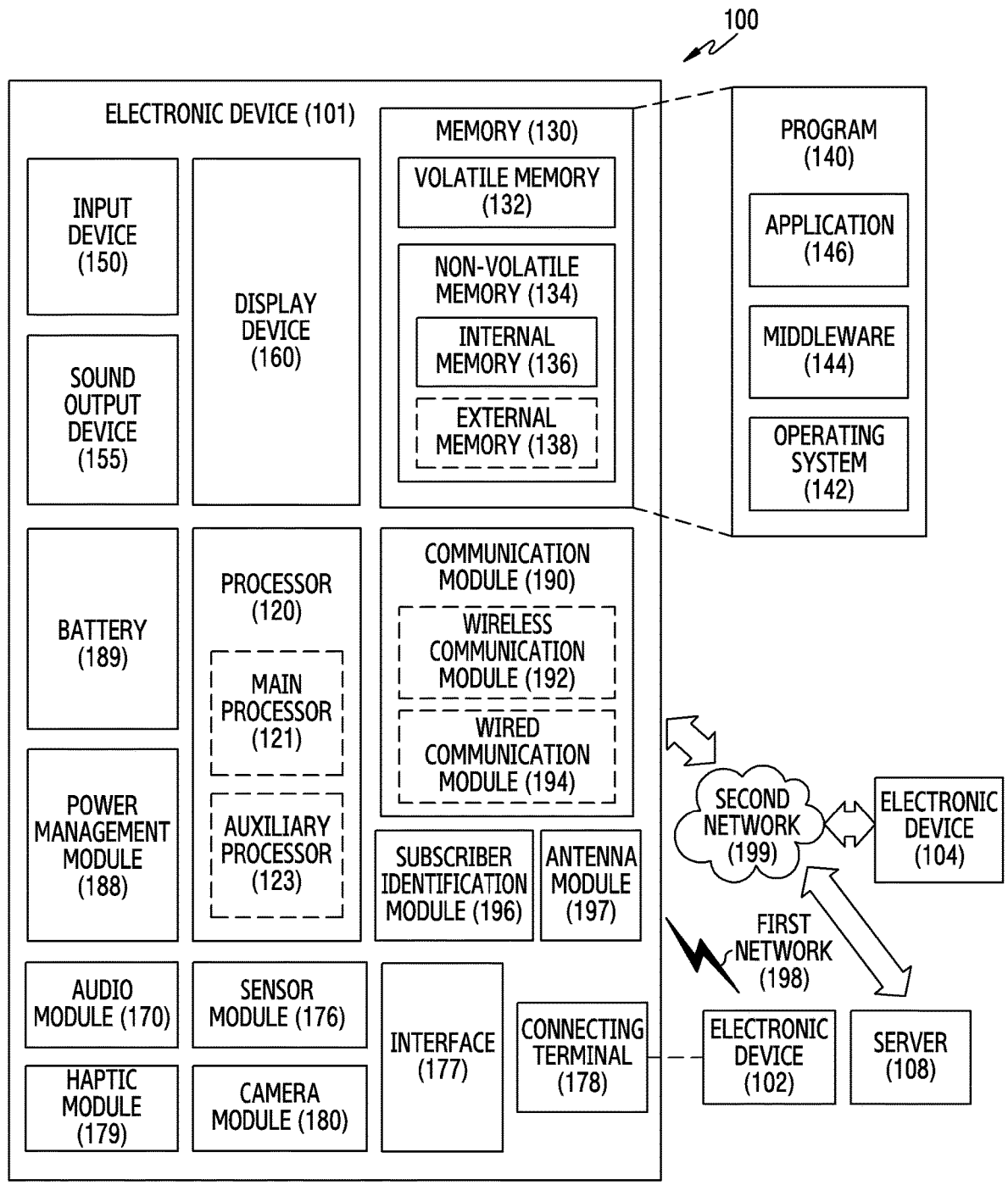
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in v volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or global navigation satellite system (GNSS) a communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments of the disclosure, an electronic device (e.g., the electronic device 101) may provide a service using genetic information. For example, the electronic device may recommend an appropriate recipe or guide an exercise through the Internet of things (IoT) device, based on the genetic information collected and analyzed from a human body sample and the amount of exercise, exercise time, food intake, and/or sleep time data monitored using a mobile device or a wearable device.

According to an embodiment, even if data directly input by a separate user is limited, the electronic device may determine disease risk, exercise ability, and/or food metabolism ability according to genetic information, and recommend a health guide suitable for the user according to the determination result.

According to an embodiment, if a service based on genetic information is applied to a common device used by multiple people, the electronic device may recommend customized exercises or recipes reflecting genetic information according to not only individuals but also user groups, and may suggest and monitor foods that are good to eat, foods to avoid, recommended exercises, and/or recommended lifestyles. The electronic device continuously accumulates data using the user's feedback, and may elaboratively recommend an appropriate exercise method or food recipe to the user.

Various embodiments to be described later, in analyzing the amount of exercise, exercise time, food intake, and/or sleep time monitored by mobile, wearable, etc. for genetic information collected and analyzed from a human body sample, may be related to analyzing information of not only one personal account but also users grouped such as a family, and guiding a recipe or exercise for individual, family, or group.

Figure 2:
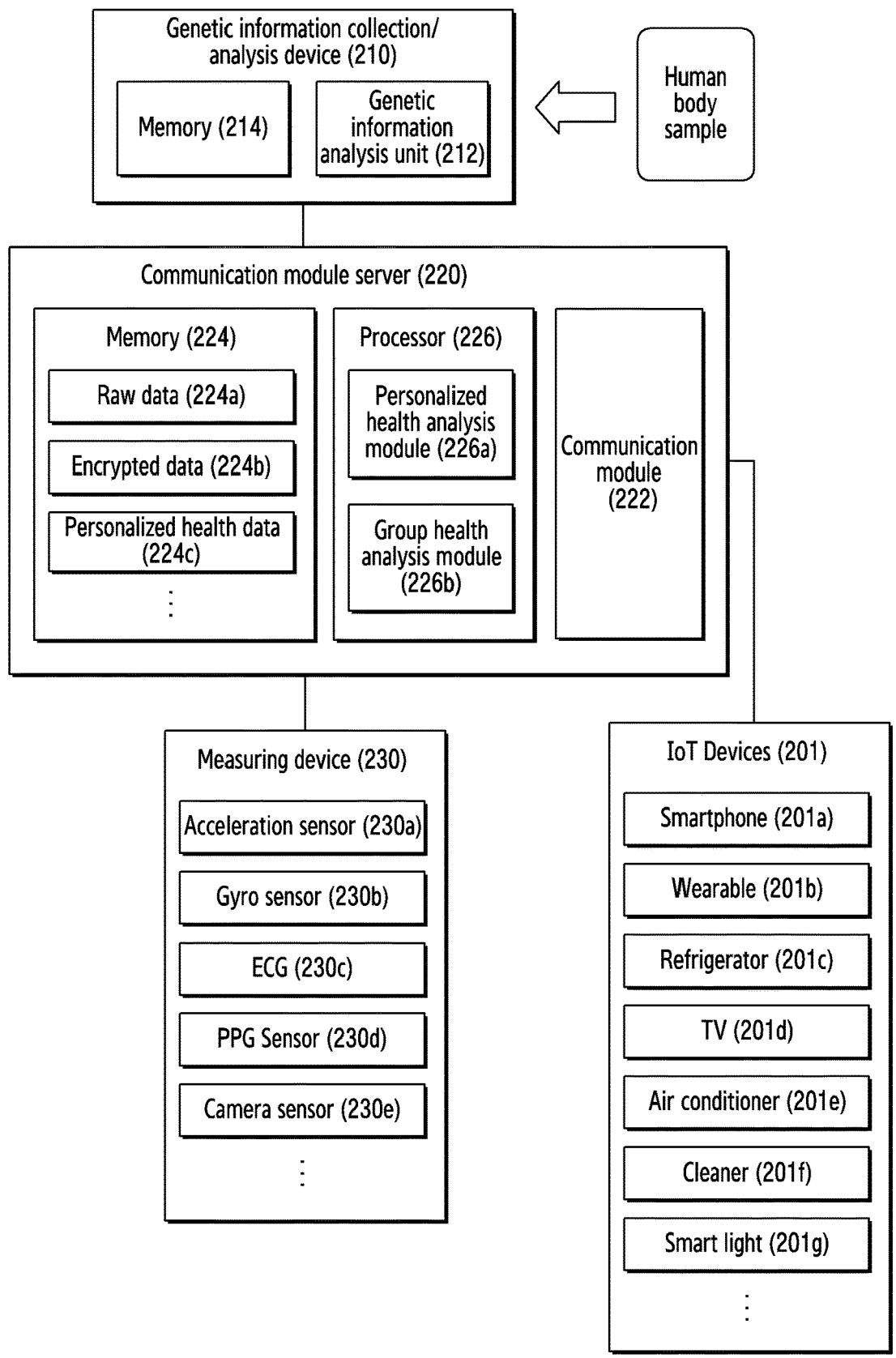
FIG. 2 is a system for providing a service, based on genetic information according to various embodiments of the disclosure.

FIG. 2 is a system 200 for providing a service, based on genetic information according to various embodiments of the disclosure.

Referring to FIG. 2, the system 200 may include a genetic information collection/analysis device 210, a server 220, a measuring device 230 and/or IoT devices 201. The server 220 may correspond to the server 108 of FIG. 1. The genetic information collection/analysis device 210, the measuring device 230, and/or the IoT devices 201 may correspond to one of the electronic devices 101, 102, and 104 of FIG. 1.

The genetic information collection/analysis device 210 may generate and analyze genetic information of at least one user. The server 220 may provide a service, based on users' accounts and genetic information. The measuring device 230 may track and log the user's personal information (e.g., a life log). The IoT devices 201 may interact with users, provide information about the user to the server 220, and output information generated by the server 220.

The genetic information collection/analysis device 210 may generate and analyze genetic information of at least one user. The server 220 may provide a service, based on users' accounts and genetic information. The measuring device 230 may track and log the user's personal information (e.g., a life log). The IoT devices 240 may interact with users, provide information about the user to the server 220, and output information generated by the server 220.

The genetic information collection/analysis device 210 may include a genetic information analysis unit 212 and a memory 214. The genetic information analysis unit 212 may generate genetic information from a human body sample extracted by a genetic information collection tool. For example, the human body sample is tissue, cells, blood, and/or body fluids collected or taken from the human body, and may include saliva, blood, and/or hair. The genetic information analysis unit 212 may generate genetic information according to at least one of various experimental techniques for analyzing the deoxyribonucleic acid (DNA) base sequence. For example, the genetic information analysis unit 212 may select and amplify only a few specific base sequences using polymerase chain reaction (PCR) and then decode the sequence, or may generate a library by specifying a plurality of base parts using an array and then decode the corresponding part, or may decode the entire base sequence of DNA using whole genome sequencing (WGS). The memory 214 may store the analyzed genetic information, and the analyzed genetic information may be transmitted to the server 220. For the transfer of genetic information, the genetic information collection/analysis device 210 may further include a communication module or a connection terminal (e.g., a USB port) or a recording device for providing genetic information to another device.

The server 220 may include a communication module 222, a memory 224 and/or a processor 226. The communication module 222 may control functions for transmitting and receiving data with other devices (e.g., the genetic information receiving/analyzing device 210, the measuring device 230, or the IoT devices 201).

For example, the communication module 222 may convert data into physical signals and convert physical signals into data. The memory 224 may store information, data, programs, and/or instructions necessary for the operation of the server 220. According to an embodiment, the memory 224 may store raw data 224a including genetic information generated by the genetic information collection/analysis device 210, encrypted data 224b including genetic information encrypted so that an individual cannot be identified, and/or personalized health data 224c including information related to a user's health measured or recorded by IoT devices 201. The genetic information stored in the memory 224 may be matched with an identifier (ID) for each user.

The processor 226 may control overall operations of the server 220. For example, the processor 226 may generate accounts of a plurality of users, based on information received from the IoT devices 201, and control to provide data (hereinafter referred to as "service data") used to provide a service, based on the accounts and/or genetic information of a plurality of users. The processor 226 may control the server 220 to perform operations according to various embodiments to be described later. According to an embodiment, the processor 226 may include a personalized health analysis module 226a and/or a group health analysis module 226b. The personalized health analysis module 226a and the group health analysis module 226b may be storage spaces in which instructions/codes or instructions/codes at least temporarily resided in the processor 226 are stored as instruction sets or codes stored in the memory 224, or may be part of circuitry configuring the processor 226.

When there is one registered account, the personalized health analysis module 226a may analyze a life pattern (e.g., daily activity steps, exercise amount, exercise time, sleep time, or food intake pattern), based on an individual's genetic advantages/disadvantages and generate personalized health recommendation information. The group health analysis module 226b may analyze the genetic advantages and disadvantages of a group including users of a plurality of accounts generated through a device used by a plurality of users, and generate personalized health recommendation information for each group, based on the analysis result. In addition, a number of accounts may be grouped based on each user's profile (e.g., height, weight, blood sugar, blood pressure, or allergy information) and preference information (e.g., favorite food or food ingredient).

The measuring device 230 may collect information for analyzing the lifestyle of at least one user. The measuring device 230 may collect at least the user's life log. In order to collect the life log, the measuring device 230 may include at least one sensor.

For example, at least one sensor may include an acceleration sensor 230a, a gyro sensor 230b, an electrocardiogra (ECG) sensor 230c, a photoplethysmogram (PPG) sensor 230d, and/or a camera sensor 230e.

According to an embodiment, the acceleration sensor 230a may be used to determine the movement and situation of at least one user. For example, when the measuring device 230 is attached to the user's body, the measuring device 230 may measure the number of steps of the user using the acceleration sensor 230a, estimate a daily activity amount, based on the number of steps, measure an activity time, and estimate a sleep time.

According to an embodiment, the gyro sensor 230b may be used to determine the user's movement and situation. For example, when the user carries the measuring device 230 and moves, the measuring device 230 may grasp a movement position, a movement distance, or a movement line using the gyro sensor 230b.

According to an embodiment, the ECG sensor 230c may be used to measure a potential that appears in relation to a heartbeat on a body surface through an electrocardiogram. The measuring device 230 may determine whether or not the heartbeat is regular using the ECG sensor 230c, and may estimate whether there is a risk of heart disease according to the determination result. For example, when the measuring device 230 is a wearable device attachable to a wrist, the ECG sensor 230c may obtain a signal from the human body using a plurality of electrodes located on the front and/or rear of the measuring device 230. According to another embodiment, the ECG sensor 230c may be used to obtain body fat information in the user's human body. For example, the ECG sensor 230c may allow a microcurrent to flow through the human body, measure resistance between electrodes, and obtain body fat information in the human body, based on the measurement result.

According to an embodiment, the PPG sensor 230d may be used to measure blood pressure, heart rate, and/or blood sugar using light. For example, the PPG sensor 230d may include a light source, a light detector, a sensor integrated circuit (IC), and/or a plurality of electrodes. The light source may include a light emitted diode (LED) having various wavelengths. The green wavelength is a wavelength that may be used to measure the heart rate, and since the green wavelength penetrates shallowly into the skin, it may have an advantage of being stiff against noise. Since the red wavelength penetrates relatively deeply into the skin, it may have the advantage of more accurately measuring a heart rate. When an infrared (IR) wavelength band is used, more biometric information such as heart rate and/or blood oxygen saturation (SPO2) may be obtained in addition to the red wavelength. When red, green and IR wavelengths are used, skin tone measurements may be possible. When a blue wavelength is used, the tendency of blood sugar may be measured. The more various LED wavelength bands are used, the more biometric information may be obtained. The wavelength band of the optical signal generated by the light source is not limited to one, but may be various, and the light source may include at least one emitter for each wavelength. The light source may include at least one photodiode. The sensor IC may include a sensor driver controller and/or an analog to digital convertor (ADC) that control(s) the PPG sensor 230*d*. The sensor driver controller may include an emitter controller and/or a detector controller. The sensor driver controller may perform at least one of a function of amplifying a signal level, a function of converting an analog value to a digital value, or a function of controlling other components.

According to an embodiment, the camera sensor 230*e* may be used to determine the external characteristics of the user. For example, the measuring device 230 may analyze a posture and/or skin health, based on an image obtained using the camera sensor 230*e*.

The IoT devices 201 may include various devices for interacting with at least one user. Each of the IoT devices 201 may determine a user's input, transmit information input by the user to the server 220, and output information (e.g., exercise, food, or lifestyle recommendations tailored to the individual or group of users) provided by the server 220. Each of the IoT devices 201 may be a device shared by a plurality of users. A plurality of users sharing the device may vary depending on the installation location of the IoT device. When the IoT device is installed in a public facility, a plurality of users may be visitors of the facility (e.g., a library, a store, a hospital, or a shopping mall). When the IoT device is used at home, a plurality of users may be family members. For example, the IoT devices 201 may include at least one of a smart phone 201*a*, a wearable 201*b*, a refrigerator 201*c*, a TV 201*d*, an air conditioner 201*e*, a cleaner 201*f*, or a smart light 201*g*. Each of the IoT devices 201 may include at least some components included in the electronic device 101 of FIG. 1.

In the system 200 described with reference to FIG. 2, the server 220 stores genetic information and may generate service data, based on the genetic information. According to another embodiment, the role of storing genetic information and the role of generating service data may be performed by other servers. For example, the server 220 may be divided into the first server for managing genetic information and the second server for generating service data. The second server may request genetic information required from the first server, and the first server may provide the genetic information to the second server.

According to various embodiments of the disclosure, the electronic device (e.g., at least one of the electronic device 101, server 220, and IoT devices 201) may include a memory (e.g., the memory 130 or the memory 224) and a processor (e.g., the processor 120 or the processor 226) connected to the memory. The processor may be configured to group genetic information of a plurality of users belonging to a user group, determine a genetic characteristic of the user group, based on the grouped genetic information, and provide the data generated based on the genetic characteristic of the user group.

According to various embodiments of the disclosure, the plurality of users belonging to the user group may include users who satisfy at least one condition of designation or identification of a connection relationship when registering an account, or approval of a group-based service.

According to various embodiments of the disclosure, the processor (e.g., the processor 120 or the processor 226) may be configured to determine second numerical values representing first numerical values indicating genetic characteristics of each of a plurality of users, and the second numerical values may include the average value, the median value, the minimum value or the maximum value of the first numerical values.

According to various embodiments of the disclosure, the data may include information on the genetic characteristics of the user group, and the information on the genetic characteristics included in the data may include information processed according to a service provided by a device to output the data.

According to various embodiments of the disclosure, the processor (e.g., the processor 120 or the processor 226) may be configured to obtain information on a first user belonging to the user group, estimate a family relationship with a second user belonging to the user group, based on the genetic information of the first user, and provide information on the estimated family relationship.

According to embodiments various of the disclosure, the processor (e.g., the processor 120 or the processor 226) may be configured to obtain information on a first user belonging to the user group, estimate the genetic information of the first user, based on the genetic information of a second user belonging to the user group, and store the estimated genetic information.

According to various embodiments of the disclosure, the electronic device further includes a communication module (e.g., the communication module 190 or the communication module 220), the processor (e.g., the processor 120 or the processor 226), through the communication module, may be configured to receive information on the life log of at least one user belonging to the user group, and to generate the data, based on the life log.

According to various embodiments of the disclosure, the electronic device further includes a communication module (e.g., the communication module 190 or the communication module 220), wherein the processor (e.g., the processor 120 or the processor 226), through the communication module, may be configured to transmit the data to a device providing the service.

According to various embodiments of the disclosure, the electronic device further includes a display (e.g., the display device 160), wherein the processor (e.g., the processor 120 or the processor 226) may be configured to display the data on the display.

According to various embodiments of the disclosure, the electronic device further includes a display (e.g., the display device 160), wherein the processor (e.g., the processor 120 or the processor 226) may be configured to determine a family relationship between a first user and a second user belonging to the user group, and to display information on the family relationship between the first user and the second user on the display.

Hereinafter, the disclosure describes various embodiments for providing a service, based on genetic information of a plurality of users. Operations described in the following embodiments may be performed by either the server 220 or the IoT devices 201, but for convenience of explanation, the operation subject will be expressed as an "electronic device".

Figure 3A:
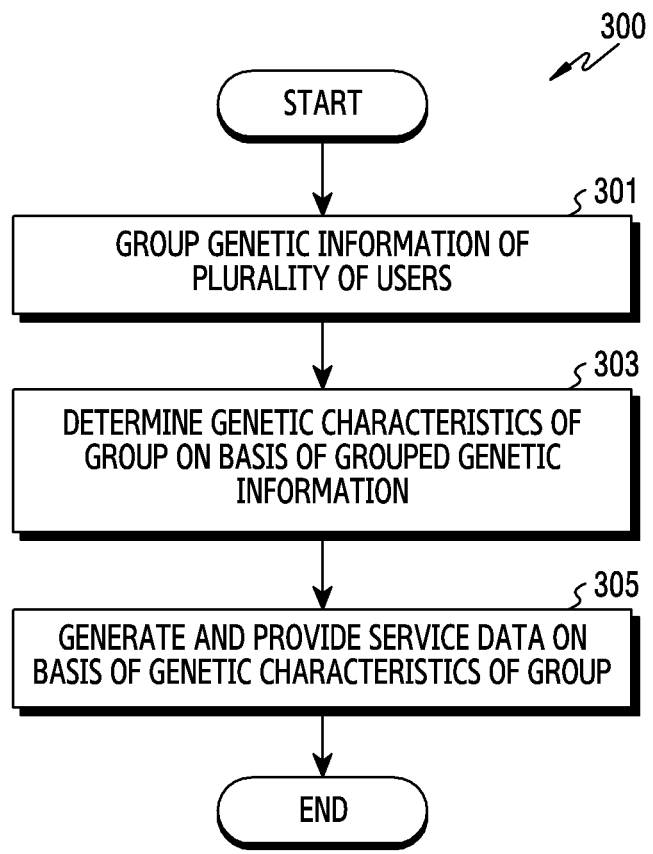
FIG. 3A is a flowchart for providing a service, based on genetic information of a plurality of users in an electronic device according to various embodiments of the disclosure.
Figure 3C:
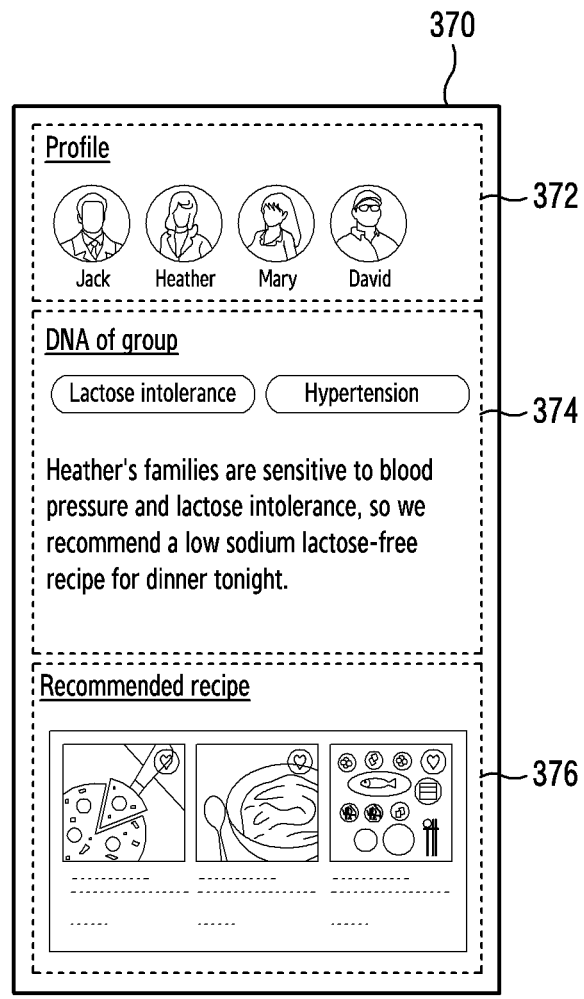
FIG. 3C is an example of a screen displayed according to a service, based on genetic information of a plurality of users according to various embodiments of the disclosure.

FIG. 3A is a flowchart 300 for providing a service, based on genetic information of a plurality of users in an electronic device according to various embodiments of the disclosure. FIG. 3B is an example of genetic information of a plurality of users according to various embodiments of the disclosure. FIG. 3C is an example of a screen displayed according to a service, based on genetic information of a plurality of users according to various embodiments of the disclosure. The operation subject of the flowchart 300 of FIG. 3A may be understood as an electronic device (e.g., one of the server 220 or IoT devices 201) or a component of the electronic device (e.g., the processor 120 or the processor 226).

Referring to FIG. 3A, in operation 301, the electronic device (e.g., the processor 120 or the processor 226) may group genetic information of plurality of users. The electronic device may store genetic information of a plurality of users. For example, the electronic device may extract genetic information of users who will receive a group-based service among all users. According to an embodiment, users to be provided with a group-based service may be a set of users who satisfy at least one condition of registering an account related to the same IoT device, designating or identifying the connection relationship when registering an account, or acquiring approval for a group-based service. According to an embodiment, the electronic device may identify users belonging to the same group, based on the user's account information (e.g., identification information of a related device, family information, and/or group information), and then group the genetic information. Through operation 301, sets of genetic information for each group may be determined. For example, an example of individual genetic information of users may be illustrated in <Table 1> below, and genetic information of a group including a plurality of users may be shown in <Table 2> below.

TABLE 1

| DISEASE/ TRAIT | GENE | SNPs (single nucleotide poly- morphisms) | Risk/ Value | Geno- type |
| --- | --- | --- | --- | --- |
| Breast Cancer | FGFR2 | rs1219648 | 3.7 (OR) | GG |
| Coronary Artery Disease | PHACTR1 | rs12526453 | 2.3 (OR) | CC |
| Obesity | FTO | rs3751812 | 1.9 (OR) | GG |
| Statin Response | SLC01B1 | rs4149056 | 4.5 (OR) | CC |
| Response to Diet (fat intake) | AP0A5 | rs662799 | 1.64 (OR) | AA |
| Response to Exercise (Glucose) | PPARG | rs1801282 | 0.25 [mmol/1] | GG |
| Response to Exercise (Insulin) | LIPC | rs1800588 | 0.22 [unit] | CC |
| Vitamin E | INTERGENIC | rs12272004 | −0.072 [μmol/1] | CC |
| Vitamin B12 | FUT2 | rs602662 | −49.77 [pg/ml] | GG |
| Vitamin B6 | NBPF3 | rs4654748 | −1.45 [ng/ml] | CC |
| Vitamin D | GC | rs2282679 | 1.49 [OR] | GG |

TABLE 2

| User | Age | Sex | Height | Weight | ... | Breast cancer risk | Coronary artery disease risk | Obesity risk | ... |
| --- | --- | --- | --- | --- | --- | --- | --- | --- | --- |
| A | 57 | M | 174 | 75 | ... | 3.7 | 1.1 | 1.9 | ... |
| B | 54 | F | 163 | 56 | ... | 1.5 | 2.3 | 2.6 | ... |
| C | 31 | M | 181 | 73 | ... | 1.3 | 0.9 | 1.7 | ... |
| D | 27 | F | 165 | 48 | ... | 2.4 | 0.7 | 2.3 | ... |
| Group {A, B, C, D} | — | — | — | — | ... | 2.4 | 2.3 | 2.45 | ... |

In <Table 1>, 'age', 'sex', 'height', and 'weight' correspond to data, based on profile or lifestyle information, and 'breast cancer', 'coronary artery disease', and 'obesity' may correspond to data, based on genetic information.

In operation 303, the electronic device may determine the genetic characteristics of the group, based on the grouped genetic information. When accounts of a plurality of users are linked as a group, genetic characteristics (e.g., scores of genetic risk) are newly determined, and genetic advantages/disadvantages may be re-evaluated according to the overall priority of the linked accounts. The genetic characteristics of a group may express the genetic statistics of users belonging to the group. For example, as illustrated in FIG. 3B, the genetic characteristic information 340 of the group (e.g., family) may be determined based on the genetic characteristic information 310 of the family 1, the genetic characteristic information 320 of the family 2, and the genetic characteristic information 330 of the family 3. Referring to FIG. 3B, the genetic characteristic information 330 may include disease risk 312, 322, 332, or 342, and/or wellness traits 314, 324, 334 or 344. Numerical values included in the group genetic characteristic information 340 may represent numerical values included in the personal genetic characteristic information 310, 320, and 330 of the family. For example, the numerical values included in the group genetic characteristic information 340 may be an average value, a median value, a minimum value, or a maximum value of numerical values included in the personal genetic characteristic information 310, 320, and 330 of the family.

In operation 305, the electronic device may generate and provide service data, based on the genetic characteristics of the group. After generating service data, the electronic device may transmit the service data to an IoT device that interacts with the user. The content and/or form of service data may vary depending on the service requested by the user and the IoT device.

For example, when a user requests a recipe recommendation through an IoT device, service data for displaying a screen 370 as illustrated in FIG. 3C may be generated. Referring to FIG. 3C, a recipe recommendation screen 370 for a group may include a list 372 of group members, a description 374 of genetic information, and a list 376 of recommended recipes. According to other embodiments, the electronic device may generate service data for recommending an exercise for cardiovascular health to a family at high risk of high blood pressure, for recommending a low-salt diet or recipe for or stomach protection to a group at high risk of gastric cancer.

For other example, when a user requests an the exercise recommendation through an IoT device, electronic device may generate service data indicating at least one exercise method, based on the number of group members and/or genetic characteristics of each of the group members. An exercise method practiced by a large number of people may be presented, and in this case, the service data may include information specifying the role of each member. A one-person exercise method commonly recommended to members of the group may be presented, and in this case, the service data may include an exercise schedule suitable for the characteristics of the member.

As in the embodiment described with reference to FIG. 3A, the electronic device may generate service data, based on the genetic information of the group. For example, the server 220 may generate service data and transmit the service data to one of the IoT devices 201 (e.g., the refrigerator 201c). The service data may include genetic information of the group. The genetic information delivered to the IoT device may include genetic information processed to conform to the characteristics of a service, not raw data. The genetic information delivered to the IoT device may be processed to express limited genetic characteristics depending on the scope required for the service to be provided. For example, when genetic information is provided to a refrigerator, genetic information expressing high/medium/low lactose intolerance sensitivity, high/medium/low caffeine sensitivity, and high/medium/low vitamin B absorption capacity may be provided.

According to another embodiment, the server 220 may transmit genetic information to the IoT device, and the IoT device may generate service data. In this case, the server 220 terminates the operation for the procedure illustrated in FIG. 3A by transmitting the group's genetic information to the IoT device, and the IoT device may generate and output (e.g., display) service data, based on the genetic information provided from the server 220. When the IoT device generates service data, the server 220 may operate as illustrated in FIG. 4 below.

Figure 4:
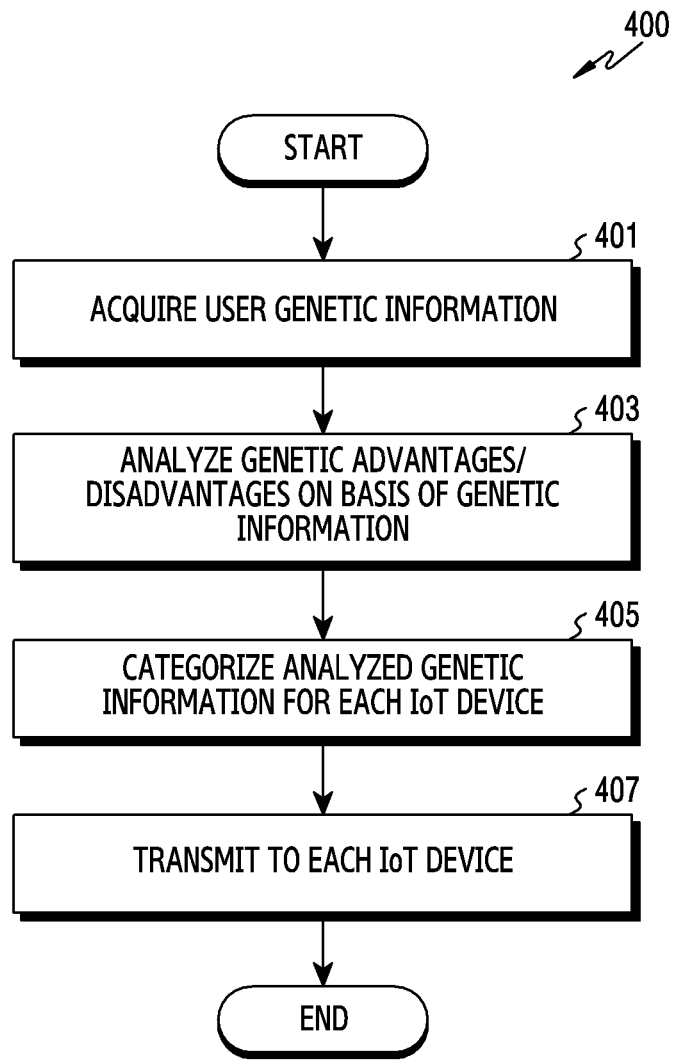
FIG. 4 is a flowchart for providing a service, based on genetic information in an electronic device according to various embodiments of the disclosure.

FIG. 4 is a flowchart 400 for providing a service, based on genetic information in an electronic device according to various embodiments of the disclosure. The operating subject of the flowchart 400 of FIG. 4 may be understood as an electronic device (e.g., the server 220) or a component of the electronic device (e.g., the processor 226).

Referring to FIG. 4, in operation 401, the electronic device (e.g., the processor 226) may obtain genetic information of the user. When an account registration for a user is requested by an IoT device (e.g., one of the IoT devices 201), the electronic device may generate and store an account and identify genetic information. For example, the electronic device may search for genetic information stored in an internal memory or may request genetic information from another server.

In operation 403, the electronic device may analyze genetic advantages and disadvantages, based on genetic information. The electronic device may store basis data used to analyze genetic information, and may estimate health-related characteristics (e.g., disease potential, favorable physical characteristics) observed in a having person the corresponding genetic information, based on the stored basis data. For example, the basis data may include information on characteristics according to the gene base sequence. In this case, the electronic device may analyze the genetic advantages/disadvantages by determining whether the obtained genetic information of the user includes a specific base sequence.

In operation 405, the electronic device may categorize the analyzed genetic information for each IoT device. The type of genetic information required may be different depending on the purpose or type of the IoT device. For example, in the case of an IoT device that recommends a recipe, genetic information related to appearance may not be required.

In operation 407, the electronic device may transmit categorized genetic information to each IoT device. According to an embodiment, the genetic information may be transmitted when the analysis of the genetic characteristics of the user is completed.

According to another embodiment, the genetic information may be transmitted according to a request from an IoT device triggered by a service request from a user.

As in the embodiment described with reference to FIG. 4, after the user's genetic information is analyzed, the analysis result may be provided to the IoT device. Analysis results of genetic information provided to the IoT device may be used to provide services. According to an embodiment, in addition to the genetic information, a life log may be further used. An embodiment in which the life log is used to generate service data will be described below with reference to FIG. 5.

Figure 5:
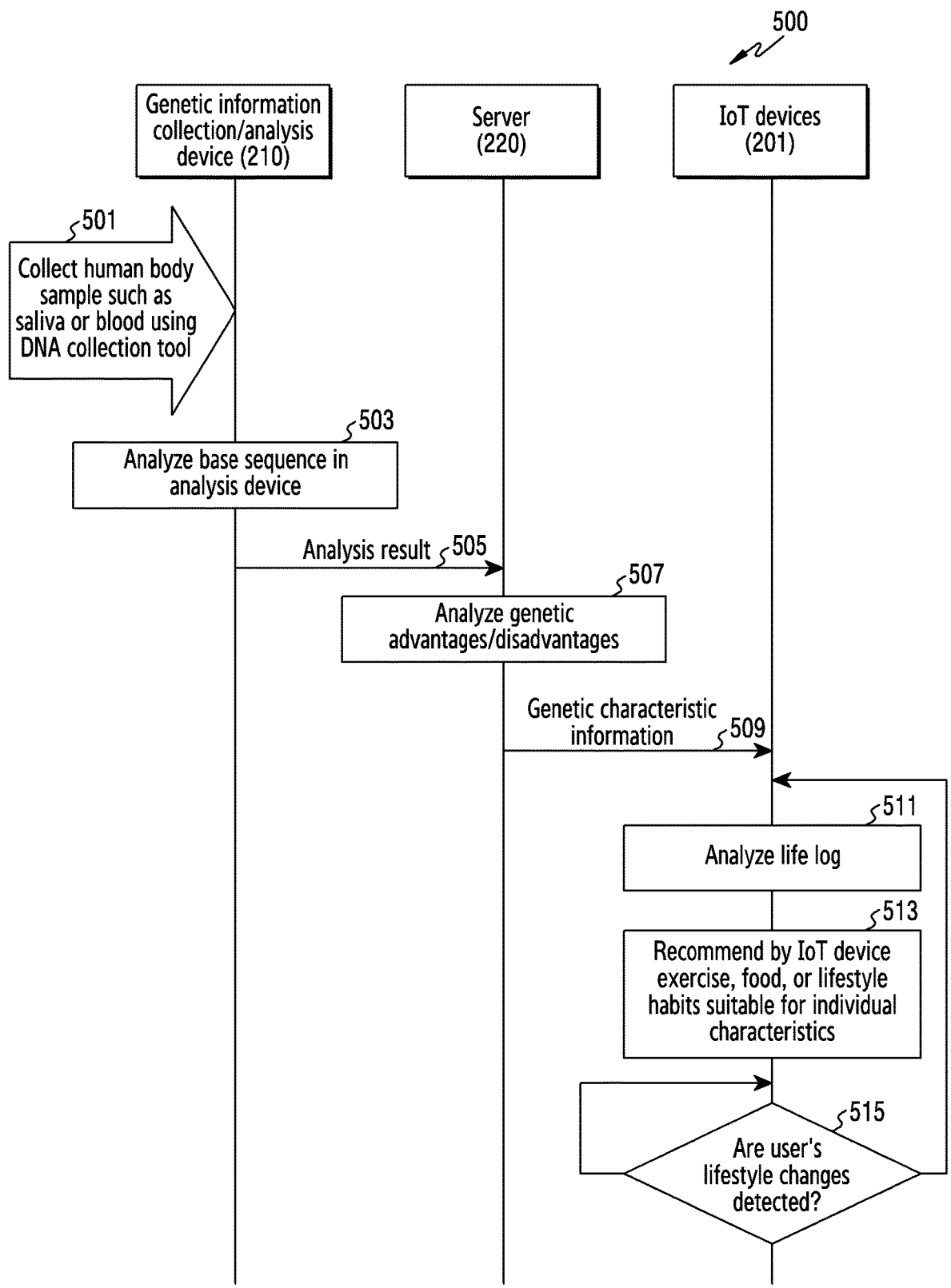
FIG. 5 is a signal exchange diagram for providing a service, based on genetic information and a life log in an electronic device according to various embodiments of the disclosure.

FIG. 5 is a signal exchange diagram 500 for providing a service, based on genetic information and a life log in an electronic device according to various embodiments of the disclosure. The operating subject of the signal exchange diagram 500 of FIG. 5 may be understood as an electronic device (e.g., a genetic information collection/analysis device 210, a server 220, a measuring device 230, or one of IoT devices 201) or a component of the electronic device (e.g., the processor 120, the genetic information analysis unit 212, and the processor 226).

Referring to FIG. 5, in operation 501, a human body sample such as saliva or blood may be collected using a DNA collection tool. DNA collection tools may be used by users or by experts.

In operation 503, the genetic information collection/analysis device 210 may analyze a base sequence. The genetic information collection/analysis device 210 may obtain a base sequence from a human body sample collected by a DNA collection tool using a technique such as PCR, array, or full-length genome sequencing.

In operation the 505, genetic information collection/analysis device 210 may transmit an analysis result to the server 220. The server 220 having received the analysis result for the base sequence may store the the genetic information analysis result of collection/analysis device 210. According to another embodiment, the analysis result may be input to the server 220 by a storage medium offline or may be received from the genetic information collection/analysis apparatus 210 using a communication means.

In operation 507, the server 220 may analyze genetic advantages/disadvantages. The server 220 may estimate health-related characteristics (e.g., disease potential, advantageous physical characteristics) observed in a person having the corresponding genetic information, based on the basis data used to analyze the base sequence. For example, the basis data may include information on characteristics according to the gene base sequence.

In operation 509, the server 220 may transmit genetic feature information to one of the IoT devices 201. The server 220 may transmit genetic feature information through an external communication network (e.g., an Internet network). For example, the genetic feature information may be periodically transmitted or may be transmitted at the request of an IoT device. The genetic feature information may be transmitted in a processed state according to the properties of the IoT device.

In operation 511, one of the IoT devices 201 may analyze a user's life log. For example, the life log may be generated by the measuring device 230. The measuring device 230 may observe changes in body and/or behavior of the user by using the provided sensors (e.g., acceleration sensor 230a, gyro sensor 230b, ECG sensor 230c, PPG sensor 230d, and/or camera sensor 230e), and may transmit data representing the observation result to the IoT device.

In operation 513, the IoT device may recommend exercise, food or lifestyle habits that suit individual characteristics. The IoT device may determine an exercise, food, or lifestyle to recommend, based on the analysis results of the genetic advantages/disadvantages and/or the life log.

According to an embodiment, the IoT device may display information for notifying the determined exercise, food, or lifestyle.

In operation 515, the IoT device may determine whether a change in the user's lifestyle is detected. The IoT device may determine whether a lifestyle change is detected based on data on the observation result provided from the measuring device 230. When a lifestyle change is detected, the IoT device may perform operation 511.

As in the embodiment described with reference to FIG. 5, the IoT device may decide which exercise, food, or lifestyle to recommend, based on the life log. According to another embodiment, the life log may be used by the server 220. In this case, the measuring device 230 may provide information on the life log to the server 220, the server 220 may generate service data, based on the life log or genetic characteristics, and provide the service data to the IoT device.

Figure 6A:
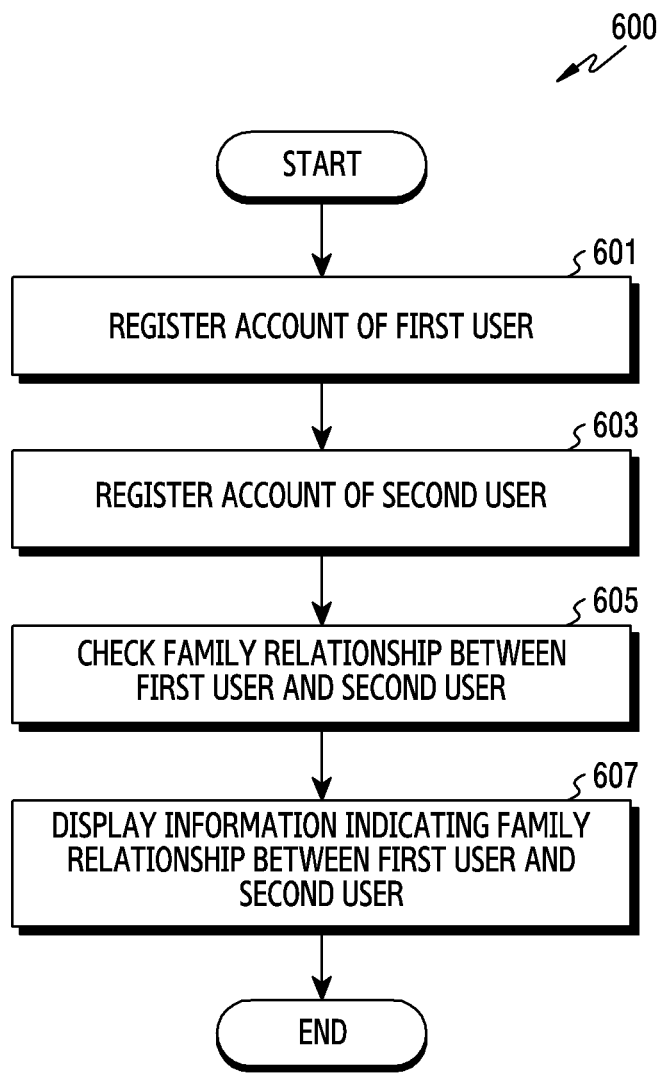
FIG. 6A is a flowchart illustrating a relationship between a plurality of users in an electronic device according to various embodiments of the disclosure.
Figure 6B:
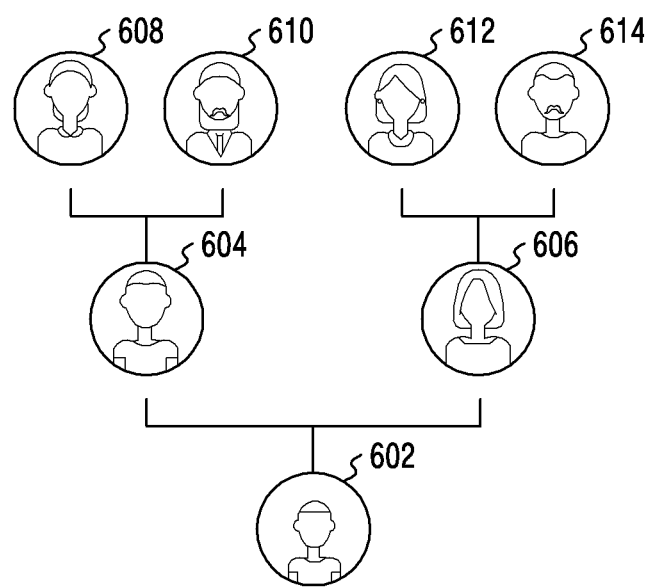
FIG. 6B is an example of a screen illustrating a relationship between a plurality of users according to various embodiments of the disclosure.

FIG. 6A is a flowchart illustrating a relationship between a plurality of users in an electronic device according to various embodiments of the disclosure. FIG. 6B is an example of a screen illustrating a relationship between a plurality of users according to various embodiments of the disclosure. The operation subject of the flowchart 600 of FIG. 6A may be understood as an electronic device (e.g., one of the IoT devices 201) or a component of the electronic device (e.g., the processor 120).

Referring to FIG. 6A, in operation 601, the electronic device (e.g., the processor 120) may register an account of the first user. For example, the electronic device may receive a request for account registration from the first user through an input means (e.g., the input device 150), and transmit information input by the first user to a server (e.g., the server 220). For example, the information input by the first user may include a name, a phone number, an email address, a gender, or an age. As another example, the information input by the first user may include information on the genetic characteristics of the first or user, may include identification information necessary to obtain the genetic information from the server. When the first user is the user registered for the first time in the electronic device, the account of the first user may be set as a default account.

In operation 603, the electronic device may register an account of the second user. For example, the electronic device may receive a request for account registration from the second user through an input means (e.g., the input device 150), and transmit information input by the second user to a server (e.g., the server 220). According to an embodiment, during the account registration procedure of the second user, the electronic device may display a screen for inquiring about whether or not there is a family relationship with the already registered user (e.g., the first user). For example, a screen for inquiring about family relations may include identification information (e.g., name, age, gender, or identification (ID)) of a registered user.

In operation 605, the electronic device may determine the family relationship between the first user and the second user. The electronic device may determine the family relationship, based on information input during account registration of the first user or the second user. For example, the electronic device may determine whether the first user and the second user are in a family relationship, based on information input by the second user on a screen for inquiring about whether the relationship is in the family. By determining the family relationship, the electronic device may determine to include the first user account and the second user account in the same group, and may request the server to link the first user account and the second user account as the same group.

In operation 607, the electronic device may display information indicating a family relationship between the first user and the second user. The information representing the family relationship may include at least one of an item representing the first user, an item representing the second user, an item representing that the first and second users have a family relationship, and an item representing the status of each user in the family. For example, information indicating a family relationship may be expressed as illustrated in FIG. 6B. Referring to FIG. 6B, items 602, 604, 606, 608, 610, 612, and 614 representing each of the family members are displayed, lines connecting the items 602, 604, 606, 608, 610, 612, and 614 express a family relationship, and display positions of the items 602, 604, 606, 608, 610, 612, and 614 may express the status of the members.

In the embodiment described with reference to FIG. 6A, the electronic device may display information indicating the family relationship after identifying whether the family relationship exists. The operations described with reference to FIG. 6A may be understood as being performed by one IoT device of the IoT devices 201. According to another embodiment, the determination of whether or not a family relationship may be performed by a server (e.g., the server 220). In this case, the IoT device may determine the family relationship by transmitting information for generating an account of the second user to the server and then receiving information notifying that the first user and the second user are in a family relationship from the server.

In the embodiment described with reference to FIG. 6A, the electronic device may display a screen for inquiring about whether or not there is a family relationship. According to an embodiment, the screen for inquiring about whether or not to inquire may include a the relative status as result of estimating of registered user (e.g., father, mother, son, daughter, brother or sister of the registered user). The result of estimating the relative status with the registered user may include information indicating the status (e.g., father) and/or probability (e.g., 70%). For example, the electronic device may extract a common genetic feature as a family by comparing the genetic information of the second user with the genetic information of already registered users, and estimate the status between the family members from the extracted common genetic feature. As another example, the estimation operation may be performed by a server (e.g., the server 220), and the estimation result may be notified to an electronic device (e.g., an IoT device).

Figure 7:
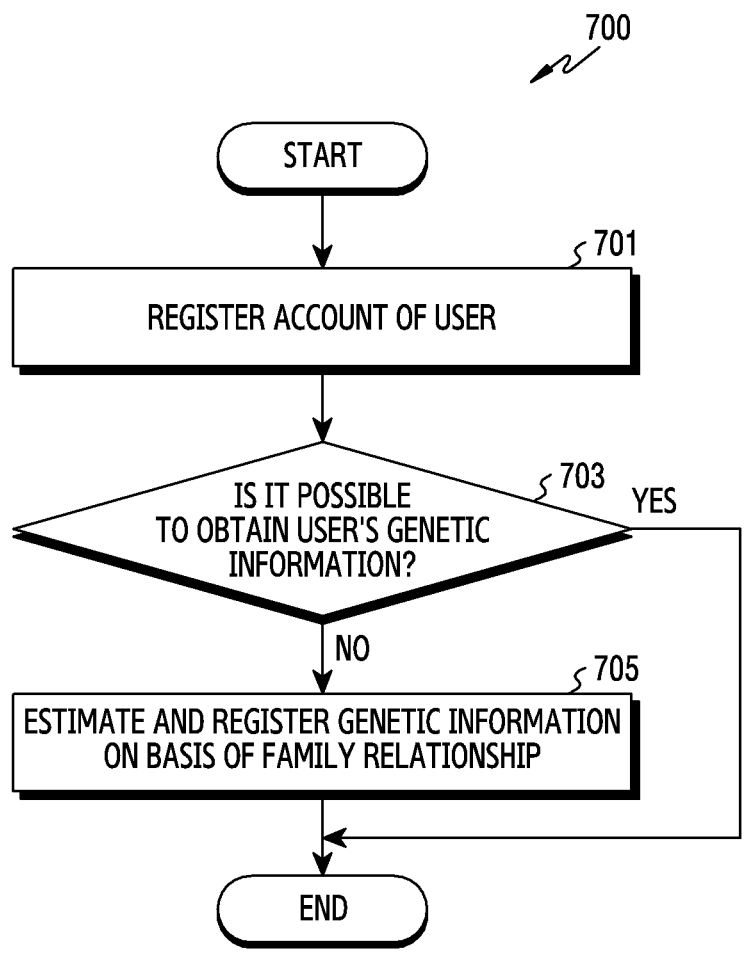
FIG. 7 is a flowchart for estimating genetic information of a user in an electronic device according to various embodiments of the disclosure.

FIG. 7 is a flowchart for estimating genetic information of a user in an electronic device according to various embodiments of the disclosure. The operation subject of the flowchart 700 of FIG. 7 may be understood as an electronic device (e.g., one of the IoT devices 201) or a component of the electronic device (e.g., the processor 120).

Referring to FIG. 7, in operation 701, the electronic device (e.g., the processor 120) may register the user's account. For example, the electronic device may register an account by displaying a screen for generating an account and transmitting information input by the user to a server (e.g., the server 220). During the account registration process, the electronic device may determine the family relationship between the user and at least one other already registered user.

In operation 703, the electronic device may determine whether the user's genetic information may be obtained. The electronic device may transmit a message inquiring whether genetic information is stored or whether genetic information is available to a server (e. g., the 220) that server manages the genetic information. When a message indicating that genetic information is not stored or is not available is received from the server, the electronic device may determine that the genetic information cannot be obtained.

If the genetic information cannot be obtained, in operation 705, the electronic device may estimate and register the genetic information, based on the family relationship. For example, if accounts of the mother and father of the user are registered and genetic information of the mother and father is available, the electronic device may estimate the genetic information of the user, based on the genetic information of the mother and father. The electronic device may estimate the user's genetic information by combining a portion of the mother's genetic information and a portion of the father's genetic information. The electronic device may register available genetic information by transmitting the estimated genetic information to the server.

In the embodiment described with reference to FIG. 7, the electronic device may estimate genetic information of a corresponding user, based on genetic information of other users in a family relationship.

According to various embodiments of the disclosure, an operation method of an electronic device (e.g., at least one of the electronic device 101, the server 220, and the IoT devices 201) may include grouping genetic information of a plurality of users belonging to a user group, determining a genetic characteristic of the user group, based on the grouped genetic information, and providing data generated based on the genetic characteristics of the user group.

According to various embodiments of the disclosure, an operation method of an electronic device (e.g., at least one of the electronic device 101, the server 220, and the IoT devices 240) may include grouping genetic information of a plurality of users belonging to a user group, determining a genetic characteristic of the user group, based on the grouped genetic information, and providing data generated based on the genetic characteristics of the user group.

According to embodiments various of the disclosure, the plurality of users belonging to the user group may include users who satisfy at least one condition of designation or identification of a connection relationship when registering an account, or approval of a group-based service.

According to various embodiments of the determining disclosure, the of the genetic characteristics of the user group may include determining second numerical values representing first numerical values indicating the genetic characteristics of each of a plurality of users, and the second numerical values may include average, median, minimum or maximum value of the first numerical values.

According to various embodiments of the disclosure, the data may include information on the genetic characteristics of the user group, and the information on the genetic characteristics included in the data may include information processed according to a service provided by a device to output the data.

According to various embodiments of the disclosure, obtaining information on the first user belonging to the user group, estimating a family relationship with the second user belonging to the user group, based on the genetic information of the first user, and providing information on the estimated family relationship may be included.

According to various embodiments of the disclosure, obtaining information on the first user belonging to the user group, estimating the genetic information of the first user, based on the genetic information of the second user belonging to the user group, and storing the estimated genetic information may be included.

According to various embodiments of the disclosure, the method may further include receiving information on a life log of at least one user belonging to the user group, and generating the data, based on the life log.

According to various embodiments of the disclosure, the providing the data may include transmitting the data to a device providing the service.

According to various embodiments of the disclosure, the providing of the data may include displaying the data on a display.

According to various embodiments of the disclosure, the method may further include identifying a family relationship between the first user and the second user belonging to the user group, and displaying information on the family relationship between the first user and the second user.

The electronic device according to various embodiments may be one of various types of electronic devices. The electronic devices may include, for example, a portable communication device (e. g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of operating an electronic device, the method comprising,
   receiving, via a communication module, a first transmission of genetic information of a plurality of users classified as a user group;
   receiving, via the communication module, a second transmission of a life log of a first user from among the plurality of users, the life log including biometric information of the first user as measured by a measuring device;
   determining, via at least one processor, genetic characteristics of the user group, wherein the genetic characteristics indicate disease risks, based on statistics generated from the genetic information;
   dividing, via the at least one processor, the genetic characteristics of the user group into subcategorizations, based on a prestored purpose or type of each of a plurality of IoT devices associated with the plurality of users; and
   transmitting, via the communication module, a first subcategorization of the genetic characteristics to at least one IoT device having a prestored purpose and/or type corresponding to the first subcategorization, thereby causing the at least one IoT device to cross-reference the life log and the first subcategorization of the genetic characteristics, and provide; guidance data generated based on a first disease risk of the user included in the indicated disease risks, as identified through the cross-referencing of the life log and the first subcategorization.

2. The method of claim 1, wherein the plurality of users belonging to the user group include users who satisfy at least one condition of designation or identification of a connection relationship when registering an account, or approval for a group-based service.

3. The method of claim 1, wherein the determining the genetic characteristics of the user group includes determining second numerical values representing first numerical values indicating the genetic characteristics of each of the plurality of users, and
   wherein the second numerical values include average, median, minimum or maximum value of the first numerical values.

4. The method of claim 1, wherein the data includes information on the genetic characteristics of the user group, and
   wherein the information on the genetic characteristics included in the data includes information processed according to a service provided by the device to output the data.

5. The method of claim 4, wherein the providing the data includes transmitting the data to a device providing the service.

6. The method of claim 1, further comprising:
   obtaining information on a first user belonging to the user group;
   estimating a family relationship with a second user belonging to the user group, based on genetic information of the first user; and
   providing information on the estimated family relationship.

7. The method of claim 1, further comprising:
   obtaining information on a first user belonging to the user group;
   estimating genetic information of the first user, based on genetic information of a second user belonging to the user group; and
   storing the estimated genetic information.

8. The method of claim 1,
   wherein the data is generated, based on the life log, and
   wherein the measuring device further includes an accelerometer and gyroscope, such that the life log includes movement information of the first user as measured over a period of time.

9. An electronic device comprising:
   at least one processor;
   a communication module; and
   memory storing instructions that, when executed by the at least one processor, cause the electronic device to:
   receive, via the communication module, a first transmission of genetic information of a plurality of users classified as a user group;
   receive, via the communication module, a second transmission of a life log of a first user from among the plurality of users, the life log including biometric information of the first user as measured by a measuring device;
   determine, via the at least one processor, genetic characteristics of the user group, wherein the genetic characteristics indicate disease risks based on statistics generated from the genetic information;
   divide, via the at least one processor, the genetic characteristics of the user group into subcategorizations, based on a prestored purpose or type of each of a plurality of IoT devices associated with the plurality of users; and
   transmit, via the communication module, a first subcategorization of the genetic characteristics to at least one IoT device having a prestored purpose and/or type corresponding to the first subcategorization, thereby causing the at least one IoT device to cross-reference the life log and the first subcategorization of the genetic characteristics, and provide guidance data generated based at least on a first disease risk of the first user included in the indicated disease risks, as identified through the cross-referencing of the life log and the first subcategorization.

10. The electronic device of claim 9, wherein the plurality of users belonging to the user group satisfy at least one condition of designation or identification of a connection relationship when registering an account, or approval for a group-based service.

11. The electronic device of claim 9, wherein the instructions, when executed by the at least one processor, cause the electronic device to determine second numerical values representing first numerical values indicating genetic characteristics of each of a plurality of users, and wherein the second numerical values include average, median, minimum or maximum value of the first numerical values.

12. The electronic device of claim 9, wherein the data include information on the genetic characteristics of the user group, and wherein the information on the genetic characteristics included in the data includes information processed according to a service provided by the device to output the data.

13. The electronic device of claim 12, further comprising a communication module, wherein the instructions, when executed by the at least one processor, cause the electronic device to:

transmit, through the communication module, the data to a device providing the service.

14. The electronic device of claim 9, wherein the instructions, when executed by the at least one processor, cause the electronic device to:

obtain information on a first user belonging to the user group;

estimate a family relationship with a second user belonging to the user group, based on genetic information of the first user; and provide information on the estimated family relationship.

15. The electronic device of claim 9, wherein the instructions, when executed by the at least one processor, cause the electronic device to:

obtain information on a first user belonging to the user group;

estimate genetic information of the first user, based on genetic information of a second user belonging to the user group; and store the estimated genetic information.

16. The electronic device of claim 9, further comprising a communication module, wherein the data is generated based on the life log, and wherein the measuring device further includes an accelerometer and gyroscope, such that the life log includes movement information of the first user as measured over a period of time.

17. The electronic device of claim 9, further comprising a display, wherein the instructions, when executed by the at least one processor, cause the electronic device to:

identify a family relationship between a first user and a second user belonging to the user group; and display information on the family relationship between the first user and the second user.

18. The method of claim 1, wherein the providing the data includes displaying the data on a display.

19. The method of claim 1, further comprising:

identifying a family relationship between a first user and a second user belonging to the user group; and displaying information on the family relationship between the first user and the second user.

20. The electronic device of claim 9, further comprising a display, wherein the instructions, when executed by the at least one processor, cause the electronic device to:

display the data on the display.

* * * * *